US007613434B2

(12) United States Patent
Aiga et al.

(10) Patent No.: US 7,613,434 B2
(45) Date of Patent: Nov. 3, 2009

(54) MULTIPLEXER AND WIRELESS RECEIVER

(75) Inventors: Fumihiko Aiga, Yokohama (JP);
Hiroyuki Kayano, Fujisawa (JP);
Tatsunori Hashimoto, Yokohama (JP);
Noritsugu Shiokawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 429 days.

(21) Appl. No.: 11/686,048

(22) Filed: Mar. 14, 2007

(65) Prior Publication Data

US 2008/0037590 A1 Feb. 14, 2008

(30) Foreign Application Priority Data

Aug. 8, 2006 (JP) ............... 2006-215446

(51) Int. Cl.
*G06F 3/033* (2006.01)
*H04B 1/26* (2006.01)
(52) U.S. Cl. ............... 455/130; 455/323; 455/327
(58) Field of Classification Search ............... 455/130, 455/323, 327, 67.13, 67.15, 278.1, 295, 296; 370/310, 314, 537
See application file for complete search history.

(56) References Cited

U.S. PATENT DOCUMENTS

| | | | | |
|---|---|---|---|---|
| 4,052,567 A | * | 10/1977 | MacKay | 370/458 |
| 4,361,728 A | * | 11/1982 | Tanabe | 370/204 |
| 5,825,756 A | * | 10/1998 | Hattori | 370/319 |
| 6,178,339 B1 | | 1/2001 | Sakai et al. | |
| 6,882,251 B2 | * | 4/2005 | Yu et al. | 333/202 |
| 7,355,452 B2 | * | 4/2008 | Kerr et al. | 326/83 |
| 7,558,814 B2 | * | 7/2009 | Lee et al. | 708/300 |
| 2003/0053492 A1 | * | 3/2003 | Matsunaga | 370/537 |

OTHER PUBLICATIONS

Raafat R. Mansour, et al., "Design Considerations of Superconductive Input Multiplexers for Satellite Applications", IEEE Transactions on Microwave Theory and Techniques, vol. 44, No. 7, Jul. 1996, pp. 1213-1228.
Gregory L. Hey-Shipton, et al., HTS Diplexer & Low Noise Amplifier RF Module, IEEE Microwave Theory and Techniques Symposium Digest, 1997, pp. 295-298.
G. Tanne, et al., "Optimal design of contiguous-band output multiplexers (COMUX)", Electronics Letters, vol. 29, No. 19, Sep. 16, 1993, pp. 1674-1675.
Yannick Latouche, et al., "High Power C-Band Dielectric Resonator Filters For Output Multiplexers", IEEE Microwave Theory and Techniques Symposium Digest, 2001, pp. 1607-1610.
U.S. Appl. No. 11/688,525, filed Mar. 20, 2007, Aiga, et al.

\* cited by examiner

*Primary Examiner*—Sonny Trinh
(74) *Attorney, Agent, or Firm*—Oblon, Spivak, McClelland, Maier & Neustadt, L.L.P.

(57) ABSTRACT

A multiplexer includes: a first band-pass filter for a first channel, which is formed in a microstrip line on a dielectric substrate and has a first branching characteristic having a center frequency of f1 and an attenuation pole at a frequency of fa1; and a second band-pass filter for a second channel, which is formed in a microstrip line on a dielectric substrate and has a second branching characteristic having a center frequency of f2 and an attenuation pole at a frequency of fa2. The following relationships (1) to (5) are satisfied: (1) f1<f2; (2) f1<fa1; (3) fa2<f2; (4) f2−fa1<(f2−f1)/2; and (5) fa2−f1<(f2−f1)/2. The second branching characteristic exhibits −20 dB or less at the frequency of fa1 and the first branching characteristic exhibits −20 dB or less at the frequency of fa2.

12 Claims, 4 Drawing Sheets

MULTIPLEXER AND WIRELESS RECEIVER

CROSS-REFERENCE TO RELATED APPLICATIONS

This application is based upon and claims the benefit of priority from the prior Japanese Patent Application No. 2006-215446, filed on Aug. 8, 2006; the entire contents of which are incorporated herein by reference.

BACKGROUND

1. Field

This invention relates to a multiplexer for wireless communication and a wireless receiver.

2. Related Art

When a certain frequency band is allocated to a wireless carrier, the allocated band is often divided into plural divisional channels (frequency bands). In a conventional base station receiving system, the divisional channels that collectively received are frequency-converted to baseband (BB) respectively and thereafter processed separately for the respective channels.

When each of the divided and converted signals passes an amplifier and a mixer, each signal generates intermodulation distortion due to non-linearity of the amplifier or the mixer. Now, the intermodulation distortion refers to the frequency component of $2f1-f2$ and $2f2-f1$ generated for two fundamental waves with frequencies of $f1$ and $f2$. Namely, the signal in a certain band generates the intermodulation distortion within the pertinent band itself and also generates the intermodulation distortion with equal upper and lower bandwidths outside the band.

Thus, in the intermodulation distortion in a certain channel range, the intermodulation distortion due to the upper and lower channels thereof is added to the intermodulation distortion generated by the pertinent channel itself. When the signal power in an intermediate channel is small, the distortion for the signal, i.e. noise with respect to the signal increases. This deteriorates equivalent carrier to noise ratio (equivalent C/N) and causes the wireless communication unstable.

IEEE Microwave Theory and Techniques vol. 44, 1213 (1996) or IEEE Microwave Theory and Techniques Symposium Digest 295 (1997) discloses a multiplexer including a small number of Chebyshev filter using a superconductive material. These multiplexers cannot branch channels for communication into each channel.

Electronic Letters 29, 1674 (1993) or IEEE Microwave Theory and Techniques Symposium Digest 1604 (2001) discloses a multiplexer for branching adjacent channels. The multiplexer includes a waveguide. However, a waveguide for branching a low frequency range becomes large.

If the respective channels are separated at an RF stage by the multiplexer, the intermodulation distortion includes only by the channel itself. This gives a merit of improving the equivalent C/N. However, in order to separate the respective channels, the multiplexer has to include band-pass filters for very small bandwidths. Further, in order to assure sufficient attenuation in adjacent channel ranges, the filters have to have a very steep skirt characteristic.

A multiplexer for separating adjacent channels has been known. However, this multiplexer includes a band-pass filter for a certain-channel, which has an attenuation pole in a band for an adjacent channel. Thus, a communication signal is attenuated transiently. In short, conventionally, the multiplexer capable of separating the respective channels for communication could not be realized and so a wireless receiver with the respective channels separated at the RF stage could not be realized.

SUMMARY

According to an aspect of this invention, there is provided a multiplexer including: a first band-pass filter for a first channel, which is formed in a microstrip line on a dielectric substrate and has a first branching characteristic having a center frequency of $f1$ and an attenuation pole at a frequency of $fa1$; and a second band-pass filter for a second channel, which is formed in a microstrip line on a dielectric substrate and has a second branching characteristic having a center frequency of $f2$ and an attenuation pole at a frequency of $fa2$. The following relationships (1) to (5) are satisfied: (1) $f1<f2$; (2) $f1<fa1$; (3) $fa2<f2$; (4) $f2-fa1<(f2-f1)/2$; and (5) $fa2-f1<(f2-f1)/2$. The second branching characteristic exhibits $-20$ dB or less at the frequency of $fa1$ and the first branching characteristic exhibits $-20$ dB or less at the frequency of $fa2$.

According to another aspect of the invention, there is provided a wireless receiver including: the multiplexer that branches a received signal from an antenna and further includes first and second channel output portions for the first and second channels, respectively; first and second low noise amplifiers connected to the first and second channel output portions, respectively; and first and second mixers, each of which includes: an input portion connected to the corresponding low noise amplifier; and an output portion connected to a corresponding baseband processor.

DETAILED DESCRIPTION

Various embodiments according to the invention will be described hereinafter with reference to the accompanying drawings. Thorough the embodiments and examples, the same reference symbols refer to the same elements and overlapped explanation will be avoided. Further, the respective figures referred to are schematic views for explaining the embodiments and facilitating its understanding. For convenience of illustration, there are some parts different from those in an actual device in their shape, size, ratio, etc. These parts can be appropriately changed with reference to the following explanation and known techniques.

First Embodiment

Figure 1:
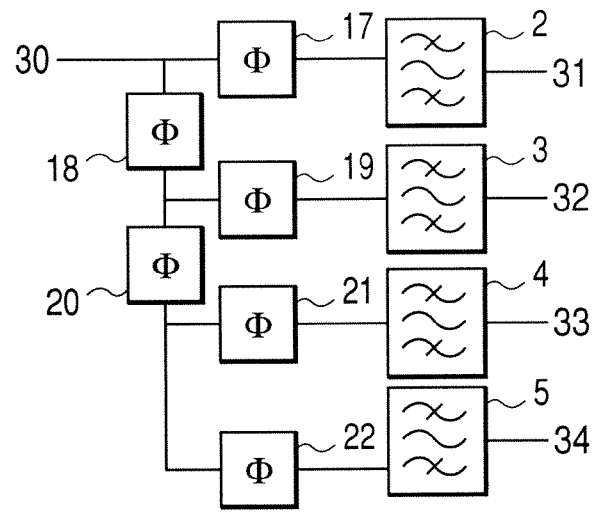
FIG. 1 is an exemplary circuit diagram of the multiplexer according to the first embodiment.

FIG. 1 is an exemplary circuit diagram of the multiplexer according to the first embodiment.

As shown in FIG. 1, a signal inputted from an input portion 30 passes band-pass filters 2, 3, 4 and 5 for the corresponding channels through delay circuits 17, 18, 19, 20, 21 and 22 and is outputted from the output portions 31, 32, 33 and 34 for the respective channels. Particularly, the delay circuit 17 is directly connected to the input portion. The band-pass filter 2 is directly connected to the delay circuit 17.

Now it is assumed that each of the delay circuits 17 to 22 includes a line with an impedance of 50Ω and with an optimum electrical length for providing a desired branching characteristic. The circuit parameter of each of the band-pass filters 2 to 5 for the corresponding channels may be optimized to provide their desired branching characteristic.

Figure 2:
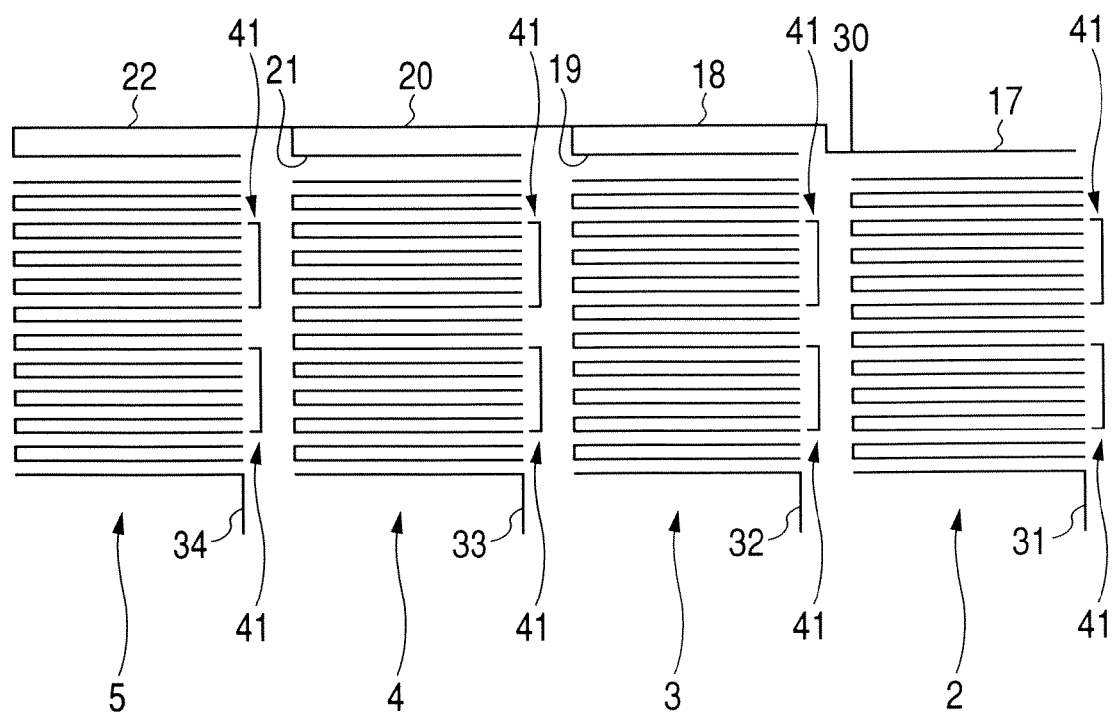
FIG. 2 is an exemplary schematic view of the multiplexer according to the first embodiment.

FIG. 2 is a schematic view of the layout for realizing the multiplexer circuit shown in FIG. 1.

A superconductive microstrip line is formed on an MgO substrate (not shown) having a thickness of about 0.43 mm and a dielectric constant of about 10. Now, the microstrip line is made of superconductor. The superconductor may be an yttrium-based copper oxide superconductor thin film having a thickness of about 500 nm. The line width of the microstrip line is about 0.4 mm. The superconductor thin film may be formed by various methods such as laser vapor-deposition, sputtering or cooperative vapor deposition.

A signal inputted from an input portion 30 passes the band-pass filters 2, 3, 4 and 5 for the corresponding channels through the delay circuits 17, 18, 19, 20, 21 and 22 and outputted from the output portions 31, 32, 33 and 34 for the respective channels.

Each of the band-pass filters 2 to 5 for the respective channels is constituted of a pseudo-elliptic function type ten-pole filter having ten hairpin resonators and two transmission lines 41 for coupling the resonators. Namely, FIG. 2 illustrates an example in which a part of the multiplexer has a superconductive characteristic and the multiplexer is formed on a single dielectric substrate. The transmission line 41 for coupling the resonators provides an attenuation pole. Ends of the transmission line 41 are electromagnetically-coupled with the ends of resonators though a gap. The coupling strength may be adjusted by the size of the gap and electric length of the transmission line 41.

The multiplexer according to the first embodiment including a first band-pass filter for a first channel, which has a first branching characteristic having a center frequency of f1 and an attenuation pole at a frequency of fa1; and a second band-pass filter for a second channel, which is formed in a microstrip line on the dielectric substrate and has a second branching characteristic having a center frequency of f2 and an attenuation pole at a frequency of fa2. The following relationships (1) to (5) are satisfied:

$$f1 < f2 \quad (1);$$

$$f1 < fa1 \quad (2);$$

$$fa2 < f2 \quad (3);$$

$$f2 - fa1 < (f2 - f1)/2 \quad (4); \text{ and}$$

$$fa2 - f1 < (f2 - f1)/2 \quad (5).$$

As a result of investigation by the inventors of this invention, it was ascertained that when the branching characteristic of the band-pass filter for the second channel at the frequency fa1 is −20 dB or less and the branching characteristic of the band-pass filter for the first channel at the frequency fa2 is −20 dB or less, the transient signal degradation can be suppressed. Namely, by locating the attenuation pole within the guard band for the first channel and second channel, the transient signal degradation can be suppressed thereby to realize a desired branching characteristic for the adjacent channels.

Now, it may be desirable that a part of the multiplexer has a superconductive characteristic. Further, the multiplexer may be formed on a single dielectric substrate. The electric lengths of the lines connected to the respective filters from the input portion of the multiplexer may be variable.

Figure 3A:
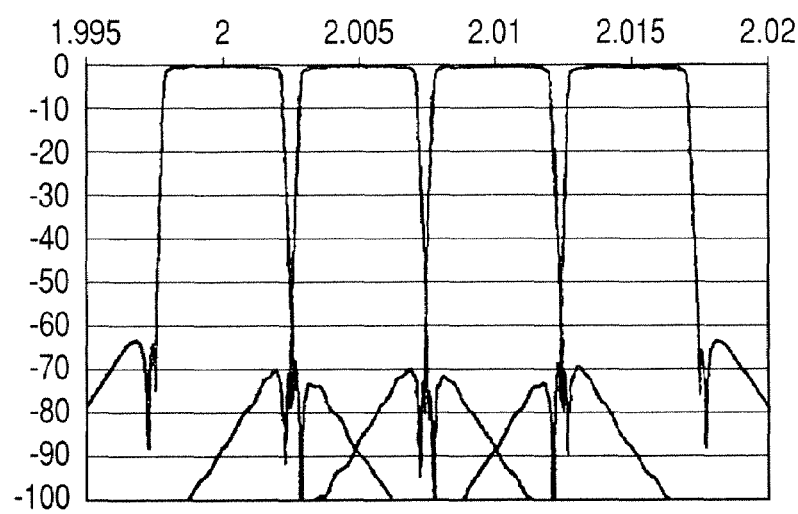
FIGS. 3A to 3C are exemplary characteristic graphs of the multiplexer according to the first embodiment.
Figure 3B:
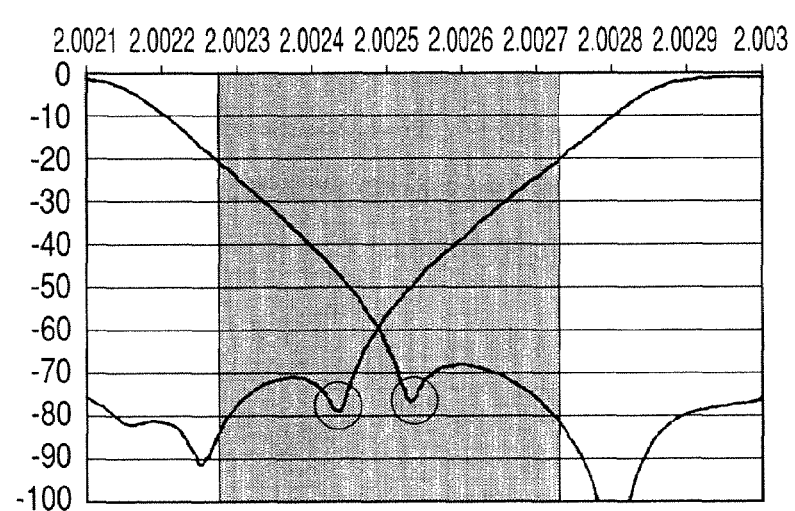

FIGS. 3A and 3B show the characteristic of the branching filer circuit shown in FIG. 1. FIG. 3B is a partial enlarged view of FIG. 3A.

The first to fourth channels have center frequencies of 2.000 GHz, 2.005 GHz, 2.010 GHz and 2.015 GHz, respectively.

First Example

Assuming that f1=2.000 GHz and f2=2.005 GHz, $$f1 < f2 \quad (1)$$

is satisfied.

The branching characteristic of the band-pass filter for the first-channel has an attenuation pole at fa1=2.00253 GHz and the branching characteristic of the band-pass filter for the second-channel has an attenuation pole at fa2=2.00243 GHz. Then, $$f1 < fa1 \quad (2)$$

$$fa2 < f2 \quad (3)$$

$$f2 - fa1 < (f2 - f1)/2 \quad (4)$$

$$fa2 - f1 < (f2 - f1)/2 \quad (5)$$

are satisfied.

The branching characteristic of the band-pass filter for the second channel at fa1 is −49.97 dB not larger than −20 dB. Further, the branching characteristic of the band-pass filter for the first channel at fa2 is −46.00 dB not larger than −20 dB.

By satisfying the relationships (1) to (5), the attenuation poles can be located within the guard band for the first and second channels. Thus, the transient signal degradation can be suppressed thereby to realize the desired branching characteristic for the adjacent channel. Incidentally, the guard band is determined according to the communication system. In this example, it refers to the range of −20 dB capable of suppressing the transient signal degradation. In FIG. 3B, the guard band refers to the range from 2.00227 GHz to 2.00273 GHz.

Second Example

Assuming that f1=2.005 GHz and f2=2.010 GHz, relationship (1) is satisfied.

The branching characteristic of the band-pass filter for the first-channel has an attenuation pole at fa1=2.00758 GHz and the branching characteristic of the band-pass filter for the second-channel has an attenuation pole has an attenuation pole at fa2=2.00742 GHz. Then, the relationships (2) to (5) are satisfied.

The branching characteristic of the band-pass filter for the second channel at fa1 is −39.68 dB not larger than −20 dB. Further, the branching characteristic of the band-pass filter for the first channel at fa2 is −40.32 dB not larger than −20 dB. Namely, by satisfying the above relationships, the attenuation poles can be located within the guard band for the first and second channels. Thus, the transient signal degradation can be suppressed thereby to realize the desired branching characteristic for the adjacent channel.

Third Example

Assuming that f1=2.010 GHz and f2=2.015 GHz, relationship (1) is satisfied. Further, the branching characteristic of the band-pass filter for the first channel has an attenuation pole at fa1=2.01257 GHz and the branching characteristic of the band-pass filter for the second channel has an attenuation pole at fa2=2.01247 GHz. Then, the relationships (2) to (5) are satisfied.

Further, branching characteristic of the band-pass filter for the second channel at fa1 is −46.38 dB not larger than −20 dB. Further, the branching characteristic of the band-pass filter for the first channel at fa2 is −49.51 dB not larger than −20 dB. Namely, by satisfying the above relationships, the attenuation poles can be located within the guard band for the first and second channels. Thus, the transient signal degradation can be suppressed thereby to realize the desired branching characteristic for the adjacent channel.

Now, the electric lengths of the delay circuits 17 to 22 are 104 degree, 74 degree, 197 degree, 231 degree, 242 degree and 169 degree, respectively, which are indicated with reference to 2 GHz. These electric lengths are not the sole solution and there are also other solutions. So, the convenient solution for implementing may be selected.

In the first embodiment, equal bandwidths are allocated to all the four channels. However, the channel having a different bandwidth may be included.

Figure 3C:
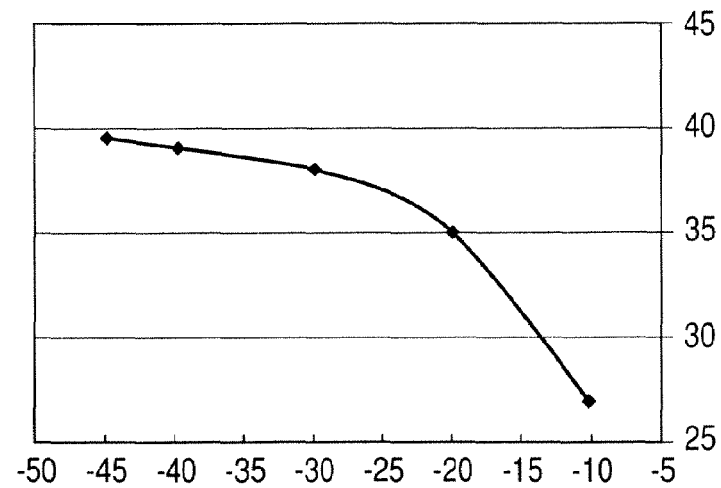

FIG. 3C shows variation of the equivalent C/N when the branching characteristic of the band-pass filter for the first channel at frequency fa1 and the branching characteristic of the band-pass filter for the first channel at frequency fa2 are varied. The horizontal axis represents the average value [dB] of the branching characteristic of the band-pass filter for the first channel at frequency fa1 and the branching characteristic of the band-pass filter for the first channel at frequency fa2. The vertical axis represents the equivalent C/N [dB]. From a standpoint of a system configuration, the equivalent C/N of 35 dB is required. Thus, both the branching characteristic of the band-pass filter for the first channel at frequency fa1 and the branching characteristic of the band-pass filter for the first channel at frequency fa2 may be −20 dB or less.

Figure 4:
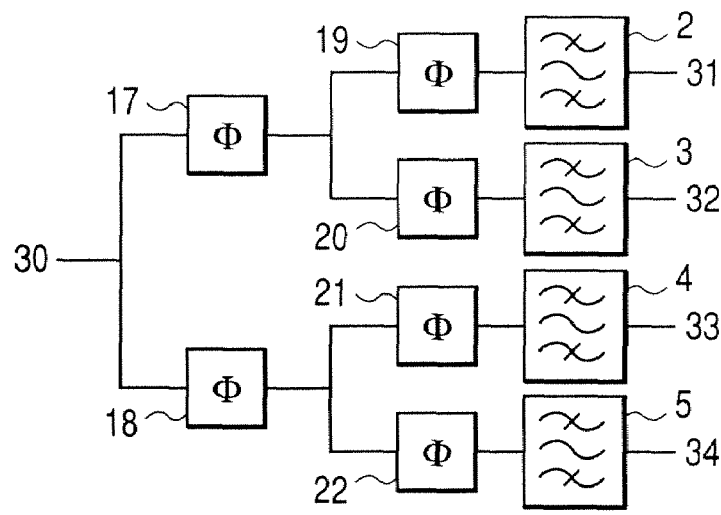
FIG. 4 is another circuit diagram of the multiplexer according to the first embodiment.

FIG. 4 shows an exemplary multiplexer realized in a circuit configuration different from that shown in FIG. 1.

The branching lines constituting the delay circuits are different from those shown in FIG. 1. Specifically, the delay circuits 17, 18 are directly connected to the input portion 30. The band-pass filter 2 is directly connected to the delay circuit 19; the band-pass filter 3 is directly connected to the delay circuit 20; the band-pass filter 4 is directly connected to the delay circuit 21; and the band-pass filter 5 is directly connected to the delay circuit 22. Moreover, the delay circuit 19 is connected to input portion 30 through the delay circuit 17; the delay circuit 20 is connected to input portion 30 through the delay circuit 17; the delay circuit 21 is connected to input portion 30 through the delay circuit 18; the delay circuit 22 is connected to input portion 30 through the delay circuit 18.

Now, the electric lengths of the delay circuits 17 to 22 are 213 degree, 148 degree, 201 degree, 155 degree, 204 degree and 156 degree, respectively, which are indicated with reference to 2 GHz. These electric lengths are not the sole solution and there are also other solutions. So, the convenient solution for implementing may be selected.

The arrangement of the input portion and output portion may be convenient for implementing as compared with that shown in FIG. 1. However, it should be noted that the branching characteristic is the same in both the arrangements of FIGS. 1 and 4.

According to the above configuration, the multiplexer is capable of branching each adjacent channel employed for communication and the wireless receiver is capable of suppressing the intermodulation distortion due to an in-band signal thereby to improve an equivalent C/N and effectively use a given communication frequency band to enable large capacity communication.

Second Embodiment

An explanation will be given of the wireless receiver according to a second embodiment.

Figure 5:
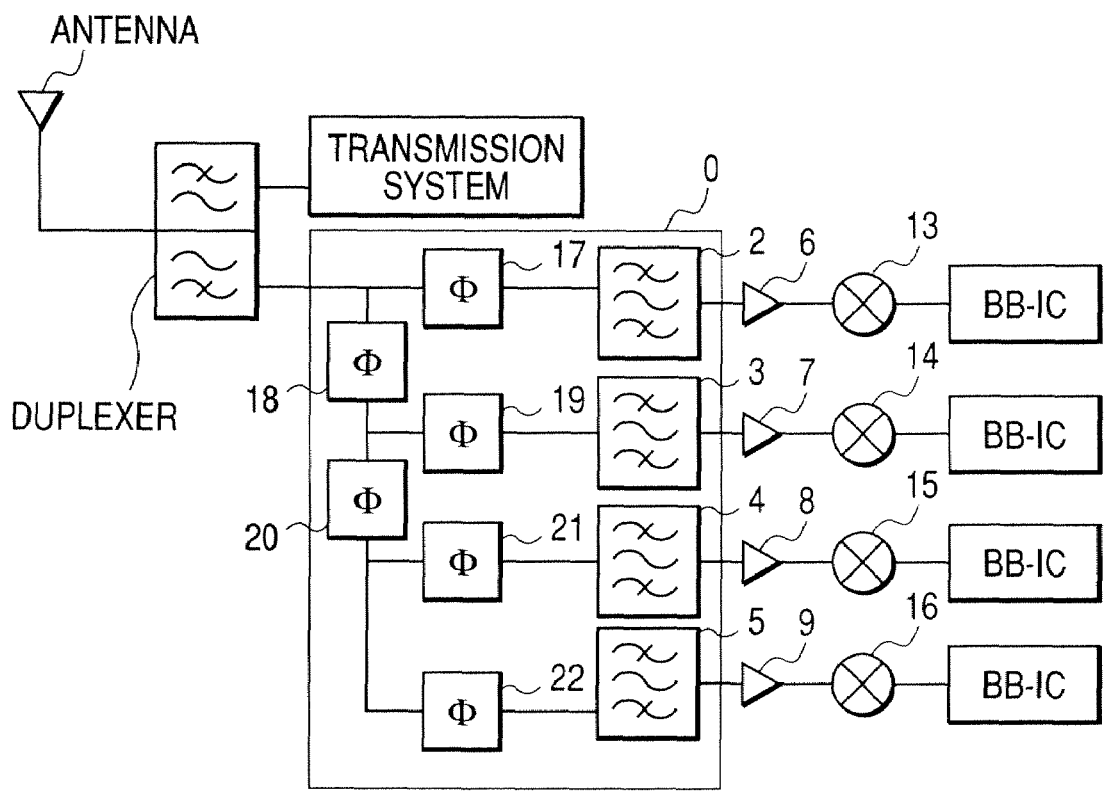
FIG. 5 is an exemplary arrangement view of a wireless receiver according to the second embodiment.

FIG. 5 is an arrangement view of the wireless receiver including the multiplexer shown in FIG. 1.

The wireless receiver includes a multiplexer 0 for branching the received signal from an antenna. The respective output portions of the multiplexer 0 are connected to LNAs 6, 7, 8 and 9 which are connected to mixers 13, 14, 15 and 16, at their subsequent stage, respectively. These mixers are connected to baseband processor BB-IC at their subsequent stage, respectively. The antenna is employed for both signal transmission and reception. A transmit signal is transmitted from the antenna through a duplexer. The received signal is received from the antenna and supplied to the multiplexer 0 through the duplexer.

In the multiplexer 0, input signals are branched into respective signal with the corresponding channel, which are sent to the corresponding output portion. The signals with the respective channel separated by the multiplexer 0 are amplified by the LNAs 6 to 9. The signals amplified by the LNAs are frequency-converted to the baseband by the mixers 13 to 16 and supplied to the baseband processors BB-ICs.

Now, the mixers 13 to 16 are directly connected to the baseband processors at their subsequent stage, respectively. It is not necessary to frequency-convert the signals from the LNAs into the baseband at one time. The signals may be frequency-converted to the baseband after once converted in the intermediate frequencies IFs. Then, the mixers 13, 14, 15 and 16 may be connected to IF filters, amplifiers and mixers at their subsequent stage, which are connected to the baseband processors at their subsequent stage. It should be noted that the wireless receiver may include the multiplexer shown in FIG. 4.

Third Embodiment

Figure 6:
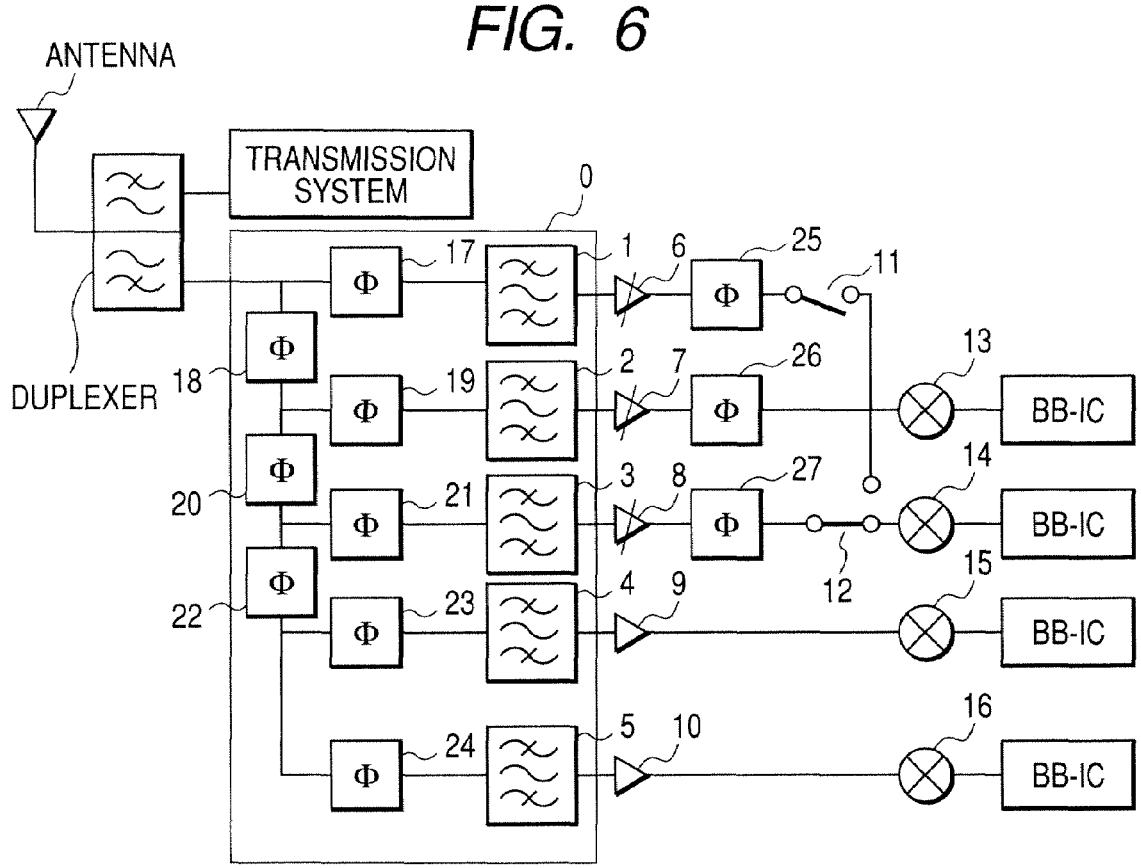
FIG. 6 is an exemplary arrangement view of a wireless receiver according to the third embodiment.

FIG. 6 is an arrangement view of the wireless receiver according to the third embodiment.

Figure 7:
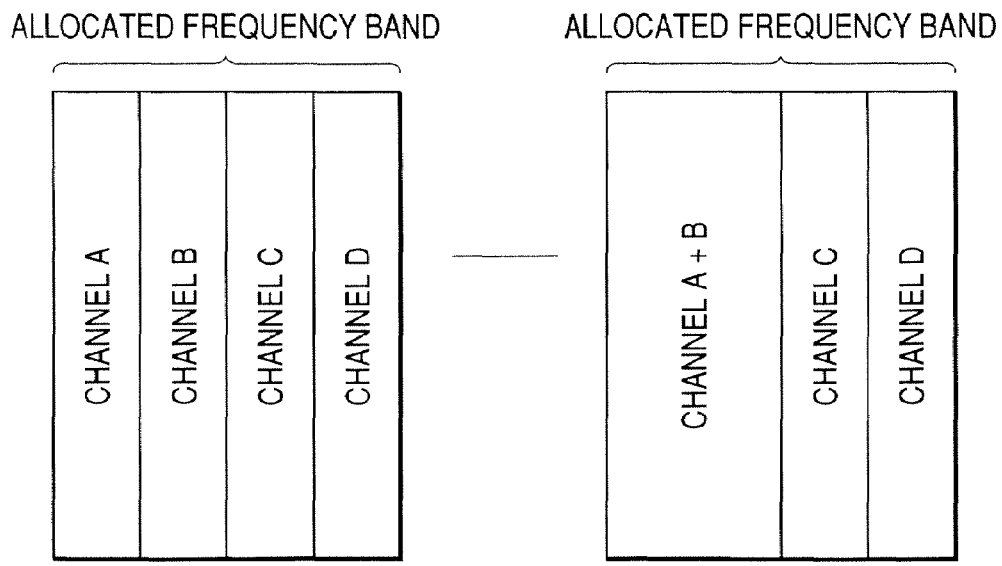
FIG. 7 is a view for explaining the case where a channel bandwidth is changed by the wireless receiver according to the third embodiment.

As shown in FIG. 7, this wireless receiver can be selected between the case where it is used in channels A, B, C and D having equal bandwidths and the case where it is used in channels A+B, C and D.

In FIG. 6, the received signal from the antenna is sent to the multiplexer 0 through the duplexer. The multiplexer 0 includes a filter 2 for channel A, a filter 3 for a channel B, a filter 4 for a channel C, a filter 5 for a channel D and a filter 1 for a guard band between the channel A and channel B. The filters 1, 2, 3, 4 and 5 are connected to the LNAs 6, 7, 8, 9 and 10, respectively. A switch 11 is configured to select switches an output state of the output from the filter 1 for the guard band either an open state where the output from the filter 1 is opened or a close state where the output from the filter 1 is multiplexed with the output of the channel A. A switch 12 is configured to select an output state of the filter 3 for the channel B either a pass state where the output is directly connected to the mixer 14 or a close state where the output is multiplexed with the output with the channel A. The mixers 13, 14, 15 and 16 are connected to the baseband ICs (BB-ICs) for the channels A, B, C and D, respectively. In the multiplexer 0, the electrical length of each of the lines 17, 18, 19, 20, 21, 22, 23 and 24 connected from the input portion to the respective filters is variable. The gain of each LNAs 6, 7, 8 and 9 is also variable. Delay circuits 25, 26 and 27 are located at their subsequent stage.

Thus, by controlling the switches 11 and 12, the wireless receiver, as shown in FIG. 7, is capable of switching either the case where it is used in the channels A, B, C and D having equal bandwidths or the case where it is used in the channels A+B, C and D.

In the third embodiment, only the filter for the guard band for the channels A and B is provided. However, a filter for a guard band for any channels may be provided. Further, in the third embodiment, two channels are merged, but three or more channels may be merged.

In the third embodiment, the wireless receiver includes the multiplexer shown in FIG. 1. However, the wireless receiver may include the multiplexer shown in FIG. 4.

In the third embodiment, the mixers 13, 14, 15 are directly connected to the baseband processors BB-ICs at their subsequent stage, respectively. However, it is not necessary to frequency-convert the signals from the LNAs to the baseband at one time. The signals may be frequency-converted to the baseband after once converted in the intermediate frequencies IFs. Then, the mixers 13, 14, 15 and 16 may be connected to IF filters, amplifiers and mixers at their subsequent stage, which are connected to the baseband processors at their subsequent stage.

In the third embodiment, equal bandwidths are allocated to all the four channels. However, the channel having a different bandwidth may be included.

In the multiplexer 0, the electrical length of each line connected from the input portion to the respective band-pass filter may be variable. The gain of each the LNAs may be also variable. The gain of the LNA is varied by changing the current passing through the LNA by incorporating a variable attenuator in the subsequent stage of the LAN. The gain may be reduced to the case where plural channel signals are multiplexed. The electric length is varied by locating a dielectric material approximated to the above of the microstrip line.

According to the third embodiment, the wireless receiver capable of instantaneously changing the bandwidth of each channel according to the kind or quantity of communication information can be realized, thereby implementing large-capacity wireless communication using a channel with a large bandwidth.

What is claimed is:

1. A multiplexer comprising:
   a first band-pass filter for a first channel, which is formed in a microstrip line on a dielectric substrate and has a first branching characteristic having a center frequency of $f1$ and an attenuation pole at a frequency of $fa1$; and
   a second band-pass filter for a second channel, which is formed in a microstrip line on a dielectric substrate and has a second branching characteristic having a center frequency of $f2$ and an attenuation pole at a frequency of $fa2$,
   wherein the following relationships (1) to (5) are satisfied:

$$f1<f2 \quad (1);$$

$$f1<fa1 \quad (2);$$

$$fa2<f2 \quad (3);$$

$$f2-fa1<(f2-f1)/2 \quad (4); \text{ and}$$

$$fa2-f1<(f2-f1)/2 \quad (5), \text{ and}$$

wherein the second branching characteristic exhibits −20 dB or less at the frequency of $fa1$ and the first branching characteristic exhibits −20 dB or less at the frequency of $fa2$.

2. The multiplexer according to claim 1, wherein at least a part of the first and second band-pass filter has a superconductive characteristic.

3. The multiplexer according to claim 1, wherein the first and second band-pass filters are formed on the same dielectric substrate.

4. A wireless receiver comprising:
   the multiplexer according to claim 1 that branches a received signal from an antenna, the multiplexer further comprising first and second channel output portions for the first and second channels, respectively;
   first and second low noise amplifiers connected to the first and second channel output portions, respectively; and
   first and second mixers, each including:
      an input portion connected to the corresponding low noise amplifier; and
      an output portion connected to a corresponding baseband processor.

5. A wireless receiver comprising:
   the multiplexer according to claim 1 that branches a received signal from an antenna, the multiplexer further comprising:
   a third band-pass filter for a guard band between the first channel and the second channel; and
   first to third output portions for the first to third band-pass filters, respectively;
   first to third low noise amplifiers connected to the first to third output portions, respectively;
   first and second mixers, each including:
      an input portion configured to connect to the corresponding low noise amplifier; and
      an output portion connected to a corresponding baseband processor;
   a first switch that selects an output state of the third band-pass filter either an open state where an output of the third band-pass filter is opened or a close state where the output of the third band-pass filter is multiplexed with an output of the first band-pass filter; and
   a second switch that selects an output state of the first filter either a close state where the output from the first band-pass filter is multiplexed with an output of the second filter or a pass state where the output from the first band-pass filter passes through to the first mixer without being multiplexed.

6. The wireless receiver according to claim 5, further comprising first to third delay circuits provided at the subsequent stage of the first to third low noise amplifiers, respectively.

7. The wireless receiver according to claim 5, further comprising a line connecting an input portion of the multiplexer and one of the first and second band-pass filters, the line having a variable electric length.

8. The wireless receiver according to claim 5, wherein a gain of each of the first to third low noise amplifiers is variable.

9. A multiplexer comprising:
   a first band-pass filter for a first channel, which is formed in a microstrip line on a dielectric substrate and has a first branching characteristic having a center frequency of f1 and an attenuation pole at a frequency of fa1;

a second band-pass filter for a second channel, which is formed in a microstrip line on a dielectric substrate and has a second branching characteristic having a center frequency of f2 and attenuation poles at frequencies of fa2 and fb2 higher than fa2, a third band-pass filter for a third channel, which is formed in a microstrip line on a dielectric substrate and has a third branching characteristic having a center frequency of f3 and attenuation poles at frequencies of fa3 and fb3 higher than fa3; and a fourth band-pass filter for a fourth channel, which is formed in a microstrip line on a dielectric substrate and has a fourth branching characteristic having a center frequency of f4 and an attenuation pole at a frequency of fa4;

an input portion; and a delay circuit directly connected to the input portion;

wherein the following relationships (1) to (15) are satisfied:

$$f1 < f2 \quad (1)$$

$$f1 < fa1 \quad (2);$$

$$fa2 < f2 \quad (3);$$

$$f2 - fa1 < (f2 - f1)/2 \quad (4);$$

$$fa2 - f1 < (f2 - f1)/2 \quad (5);$$

$$f2 < f3 \quad (6);$$

$$f2 < fb2 \quad (7);$$

$$fa3 < f3 \quad (8);$$

$$f3 - fb2 < (f3 - f2)/2 \quad (9);$$

$$fa3 - f2 < (f3 - f2)/2 \quad (10);$$

$$f3 < f4 \quad (11);$$

$$f3 < fb3 \quad (12);$$

$$fa4 < f4 \quad (13);$$

$$f4 - fb3 < (f4 - f3)/2 \quad (14); \text{ and}$$

$$fa4 - f3 < (f4 - f3)/2 \quad (15),$$

wherein the second branching characteristic exhibits −20 dB or less at the frequency of fa1 and the first branching characteristic exhibits −20 dB or less at the frequency of fa2, wherein the third branching characteristic exhibits −20 dB or less at the frequency of fb2 and the second branching characteristic exhibits −20 dB or less at the frequency of fa3, wherein the fourth branching characteristic exhibits −20 dB or less at the frequency of fb3 and the third branching characteristic exhibits −20 dB or less at the frequency of fa4, and wherein one of the first to fourth band-pass filters is directly connected to the delay circuit.

10. A wireless receiver comprising:

the multiplexer according to claim 9 that branches a received signal from an antenna, the multiplexer further comprising first to fourth channel output portions for the first to fourth channels, respectively;

first to fourth low noise amplifiers connected to the first to fourth channel output portions, respectively; and first to fourth mixers, each including:

an input portion connected to the corresponding low noise amplifier; and an output portion connected to a corresponding baseband processor.

11. A multiplexer comprising:

a first band-pass filter for a first channel, which is formed in a microstrip line on a dielectric substrate and has a first branching characteristic having a center frequency of f1 and an attenuation pole at a frequency of fa1;

a second band-pass filter for a second channel, which is formed in a microstrip line on a dielectric substrate and has a second branching characteristic having a center frequency of f2 and attenuation poles at frequencies of fa2 and fb2 higher than fa2, a third band-pass filter for a third channel, which is formed in a microstrip line on a dielectric substrate and has a third branching characteristic having a center frequency of f3 and attenuation poles at frequencies of fa3 and fb3 higher than fa3; and a fourth band-pass filter for a fourth channel, which is formed in a microstrip line on a dielectric substrate and has a fourth branching characteristic having a center frequency of f4 and an attenuation pole at a frequency of fa4;

an input portion; and a fifth and sixth delay circuit, each directly connected to the input portion; and a first to fourth delay circuit, each directly connected to the first to fourth band-pass filters, wherein the following relationships (1) to (15) are satisfied:

$$f1 < f2 \quad (1);$$

$$f1 < fa1 \quad (2);$$

$$fa2 < f2 \quad (3);$$

$$f2 - fa1 < (f2 - f1)/2 \quad (4);$$

$$fa2 - f1 < (f2 - f1)/2 \quad (5);$$

$$f2 < f3 \quad (6);$$

$$f2 < fb2 \quad (7);$$

$$fa3 < f3 \quad (8);$$

$$f3 - fb2 < (f3 - f2)/2 \quad (9);$$

$$fa3 - f2 < (f3 - f2)/2 \quad (10);$$

$$f3 < f4 \quad (11);$$

$$f3 < fb3 \quad (12);$$

$$fa4 < f4 \quad (13);$$

$$f4 - fb3 < (f4 - f3)/2 \quad (14); \text{ and}$$

$$fa4 - f3 < (f4 - f3)/2 \quad (15),$$

wherein the second branching characteristic exhibits −20 dB or less at the frequency of fa1 and the first branching characteristic exhibits −20 dB or less at the frequency of fa2, wherein the third branching characteristic exhibits −20 dB or less at the frequency of fb2 and the second branching characteristic exhibits −20 dB or less at the frequency of fa3, wherein the fourth branching characteristic exhibits −20 dB or less at the frequency of fb3 and the third branching characteristic exhibits −20 dB or less at the frequency of fa4, and wherein each of the first to fourth delay circuits is connected to the input portion through either the fifth or sixth delay circuit.

12. A wireless receiver comprising:

the multiplexer according to claim 11 that branches a received signal from an antenna, the multiplexer further comprising first to fourth channel output portions for the first to fourth channels, respectively;

first to fourth low noise amplifiers connected to the first to fourth channel output portions, respectively; and first to fourth mixers, each including:
- an input portion connected to the corresponding low noise amplifier; and
- an output portion connected to a corresponding baseband processor.

* * * * *